(12) United States Patent
Remes

(10) Patent No.: US 9,643,606 B2
(45) Date of Patent: May 9, 2017

(54) VEHICLE CONTROL IN TRAFFIC CONDITIONS

(71) Applicant: Ford Global Technologies, LLC, Dearborn, MI (US)

(72) Inventor: Enrique Remes, Huixquilucan (MX)

(73) Assignee: Ford Global Technologies, LLC, Dearborn, MI (US)

( * ) Notice: Subject to any disclaimer, the term of this patent is extended or adjusted under 35 U.S.C. 154(b) by 41 days.

(21) Appl. No.: 14/686,268

(22) Filed: Apr. 14, 2015

(65) Prior Publication Data

US 2016/0304091 A1    Oct. 20, 2016

(51) Int. Cl.
*B60T 8/32* (2006.01)
*G05D 1/00* (2006.01)
*G06F 7/00* (2006.01)
*G06F 17/00* (2006.01)
*B60W 30/14* (2006.01)
*B60W 50/08* (2012.01)
*B60T 7/12* (2006.01)
*B60T 7/22* (2006.01)

(52) U.S. Cl.
CPC ........... *B60W 30/146* (2013.01); *B60T 7/12* (2013.01); *B60T 7/22* (2013.01); *B60W 50/08* (2013.01); *B60T 2201/022* (2013.01)

(58) Field of Classification Search
CPC ................. B60T 7/12; B60W 50/08
USPC ......................................................... 701/93
See application file for complete search history.

(56) References Cited

U.S. PATENT DOCUMENTS

| | | | |
|---|---|---|---|
| 4,077,487 A | 3/1978 | Misinchuk | |
| 5,603,674 A | 2/1997 | Rivas et al. | |
| 7,295,904 B2 | 11/2007 | Kanevsky et al. | |
| 2004/0144195 A1 | 7/2004 | Rancourt et al. | |
| 2009/0018723 A1* | 1/2009 | Chevion | B60W 50/16 701/36 |
| 2010/0228427 A1* | 9/2010 | Anderson | B60W 30/09 701/31.4 |
| 2010/0288567 A1 | 11/2010 | Bonne | |
| 2015/0123947 A1* | 5/2015 | Jubner | G06F 3/04842 345/175 |
| 2015/0346724 A1* | 12/2015 | Jones | B60W 30/12 701/23 |

\* cited by examiner

*Primary Examiner* — Maceeh Anwari
(74) *Attorney, Agent, or Firm* — Frank A. MacKenzie; Brooks Kushman P.C.

(57) ABSTRACT

A vehicle may include a steering wheel assembly, a powertrain, and a controller. The steering wheel assembly may include an interface. The controller may be programmed to, in response to a vehicle speed being less than a threshold, enable the interface to receive a driver input, and in response to a driver input received while the vehicle speed is less than the threshold, operate a powertrain to increase/decrease the vehicle speed subject to a range of authority.

8 Claims, 4 Drawing Sheets

VEHICLE CONTROL IN TRAFFIC CONDITIONS

TECHNICAL FIELD

The present application relates to control systems for vehicles during idle and stopped traffic conditions.

BACKGROUND

Some vehicles may be equipped with steering wheel mounted controls. Commonly, such controls include cruise control buttons that may enable a driver to set a vehicle speed during cruising conditions and adjust the vehicle speed while cruising. Additionally, such controls can include buttons to interface with an audio system or an infotainment system.

SUMMARY

A vehicle includes a steering wheel assembly including an interface, and a controller. The controller, in response to a speed of the vehicle falling below a threshold, enables the interface. The controller also, in response to a first driver input via the interface while enabled, applies a vehicle speed limit based on a first range of authority associated with the first driver input, and operates a powertrain to increase the speed.

A vehicle includes a proximity sensor configured to provide a signal indicative of a presence of another vehicle proximate the vehicle, a controller, and a first interface portion disposed on a grip portion of a steering wheel. In response to an input via the first interface portion, while another vehicle is proximate the vehicle and a speed of the vehicle is less than a threshold, the first interface portion provides a signal indicative of an adjusted accelerator pedal position to the controller and the controller operates a powertrain such that the speed increases.

A method of controlling a vehicle in traffic jam conditions includes, in response to another vehicle being within a predetermined distance from the vehicle and a speed of the vehicle being less than a threshold, entering a traffic mode that defines a speed limit and a rate of speed increase. The method also includes, in response to an input at a first interface portion while in the traffic mode, increasing the speed at the rate up to the speed limit.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
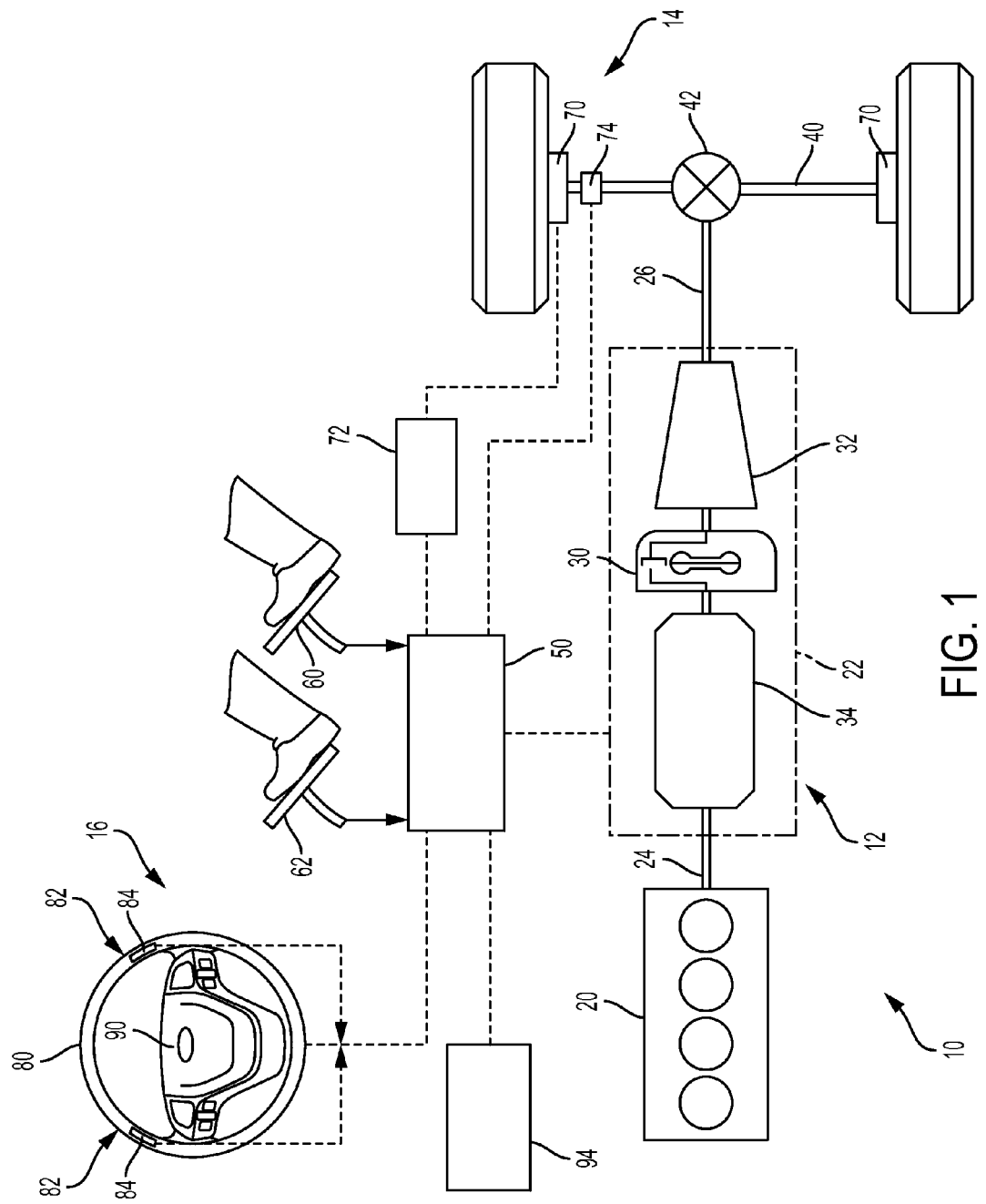
FIG. 1 an exemplary vehicle.

Referring to FIG. 1, an exemplary vehicle is shown. The vehicle 10 may be of any suitable type, such as a truck, bus, farm equipment, military transport, or cargo loading equipment. The vehicle 10 may include a powertrain 12, a drive axle assembly 14, and a steering wheel assembly 16.

The powertrain 12 may provide power or torque to the drive axle assembly 14 to propel the vehicle 10. The powertrain 12 may include an engine 20 operatively coupled to a transmission 22 by an input shaft 24.

The engine 20 may be configured as an internal combustion engine that may be adapted to operate using any suitable type of fuel, such as gasoline, diesel, ethanol, hydrogen, etc. The engine 20 may provide power or a propulsive torque to the transmission 22.

The transmission 22 may be operatively connected to the engine 20 by the input shaft 24. The transmission 22 may be operatively connected to the drive axle assembly 14 by an output shaft 26.

The transmission 22 may be of any suitable type, such as an automatic or manual multi-gear or step ratio transmission. The transmission 22 may include a torque converter 30 and a gear box 32.

The torque converter 30 may be positioned between the engine 20 and the gearbox 28. The torque converter 30 may provide a hydraulic coupling between the engine 20 and the gearbox 32. The torque converter 30 may also provide torsional isolation to the driveline such that the driveline may be isolated from disturbances or perturbations.

The gearbox 32 may include multiple gearing arrangements or friction elements configured to provide a plurality of gear ratios. The plurality of gear ratios may selectively vary an output torque of the transmission 22 based on a transmission state.

In at least one embodiment, the transmission 22 may include an electric drive system 34. The electric drive system 34 may include a friction element such as a disconnect clutch and an electric machine such as an electric motor generator and an associated traction battery. The electric drive system 34 may be selectively coupled to the engine 20 via the friction element. At least one of the engine 20 and the electric drive system 34 may provide torque or power to the drive axle assembly 14 via the output shaft 26 to propel the vehicle 10.

The drive axle assembly 14 may rotatably support a wheel assembly via a drive axle 40. The output shaft 26 may be connected to an input of a differential 42. The torque applied to the output shaft 26 may be transmitted through the differential 42 and to the drive axle 40 to rotate the wheel assembly.

The vehicle 10 may include a controller 50. The controller 50 may be configured to schedule transmission shift events, output a transmission gear position, vary a powertrain output torque, or a power-split between powertrain components if the vehicle 10 is so equipped. The controller 50 may control various friction elements or actuators of the transmission 22, such as clutches and/or brakes, to selectively transmit power from the engine 20 to the wheel assembly according to various transmission gear ratios.

The controller 50 may be configured to interpret inputs provided by an accelerator pedal 60 and a brake pedal 62. The accelerator pedal 60 may provide a signal indicative of an accelerator pedal position to the controller 50. The controller 50 may be provided with an accelerator pedal map that may relate an accelerator pedal position to a powertrain output torque. The controller 50 may vary the powertrain output torque in response to changes in the accelerator pedal position. For example, a decrease in the accelerator pedal position may correspond to a request for reduced powertrain output torque and the powertrain 12 may be operated such that a vehicle speed decreases. An increase in the accelerator pedal position may correspond to a request for increased powertrain output torque and the powertrain 12 may be operated such that a vehicle speed increases.

The brake pedal 62 may provide a signal indicative of a brake pedal position to the controller 50. The controller 50 may be in communication with a brake assembly 70. In response to brake pedal 62 actuation, the controller 50 may operate a friction brake of the brake assembly 70 to slow or inhibit rotation of at least one wheel associated with the vehicle 10 to reduce a vehicle speed. The brake assembly 70 may be configured as a drum brake or a disc brake. The brake assembly 70 may include an ABS module 72. The ABS module 72 may control or vary the braking force applied by the brake assembly 70 based on the brake pedal position. In at least one embodiment, the ABS module 72 may be configured to monitor a vehicle speed. In at least one embodiment, a standalone wheel speed sensor 74 may be disposed proximate a wheel and provide a signal indicative of the wheel speed to the controller 50.

The steering wheel assembly 16 may be configured to provide an input to a steering system to vary a wheel direction of a wheel assembly. The steering wheel assembly 16 may include a steering wheel 80 in rotatable connection with a wheel assembly through a steering linkage. The steering linkage may articulate or pivot the wheel assembly based on a steering wheel angle position.

Traffic jams and bumper-to-bumper traffic are very common in larger cities. The operator of the vehicle 10 may repeatedly actuate the accelerator pedal 60 and subsequently the brake pedal 62 in order to maintain a distance between a vehicle forward of the vehicle 10 while the traffic is moving slowly. The repeated actuation of the accelerator pedal 60 and the brake pedal 62 may lead to operator fatigue. An ergonomic benefit to the operator of the vehicle 10 may be provided by a pair of powertrain controls disposed proximate a grip portion 82 of the steering wheel 80.

The powertrain controls may be provided as part of an interface 84. The interface 84 may be disposed on or proximate a first surface 86 of the steering wheel 80 proximate a grip portion 82. The first surface 86 of the steering wheel 80 may face towards an operator of the vehicle 10. In at least one embodiment, the interface 84 may be disposed on or proximate a second surface 88 of the steering wheel 80. The second surface 88 may be disposed opposite the first surface 86 and face away from the operator of the vehicle 10. In a further embodiment, the interface may be disposed on or proximate a steering wheel center or steering wheel hub 90.

The interface 84 may enable the operator of the vehicle 10 to operate the powertrain 12 and the brake assembly 70 in lieu of the accelerator pedal 60 and the brake pedal 62, respectively. The interface 84 may include a button, a pressure sensitive switch, a touch sensitive surface, smart surface or the like, enabled while the vehicle 10 is operating in traffic jam conditions.

The controller 50 may be configured to detect conditions indicative of the vehicle 10 operating in traffic jam conditions based on a transmission state, a distance between the vehicle 10 and a vehicle proximate the vehicle 10, and a vehicle speed. The transmission 22 may provide a signal indicative of the transmission state, e.g. drive state and current gear ratio or neutral state, to the controller 50. A proximity sensor 94 may provide a signal indicative of a distance between the vehicle 10 and a vehicle proximate the vehicle 10 to the controller 50. At least one of the ABS module 72 and the wheel speed sensor 74 may provide a signal indicative of the vehicle speed to the controller 50. The controller 50 may operate the vehicle 10 in traffic mode in response to the transmission 22 being in a drive state, the distance between the vehicle 10 and the vehicle proximate the vehicle 10 being within a predetermined distance, and a vehicle speed being less than a threshold.

In at least one embodiment, the controller 50 may be configured to determine traffic jam conditions based on a predetermined number of brake pedal 62 depressions within a predetermined period of time and the distance between the vehicle 10, a vehicle proximate the vehicle 10, and a vehicle speed.

Figure 2:
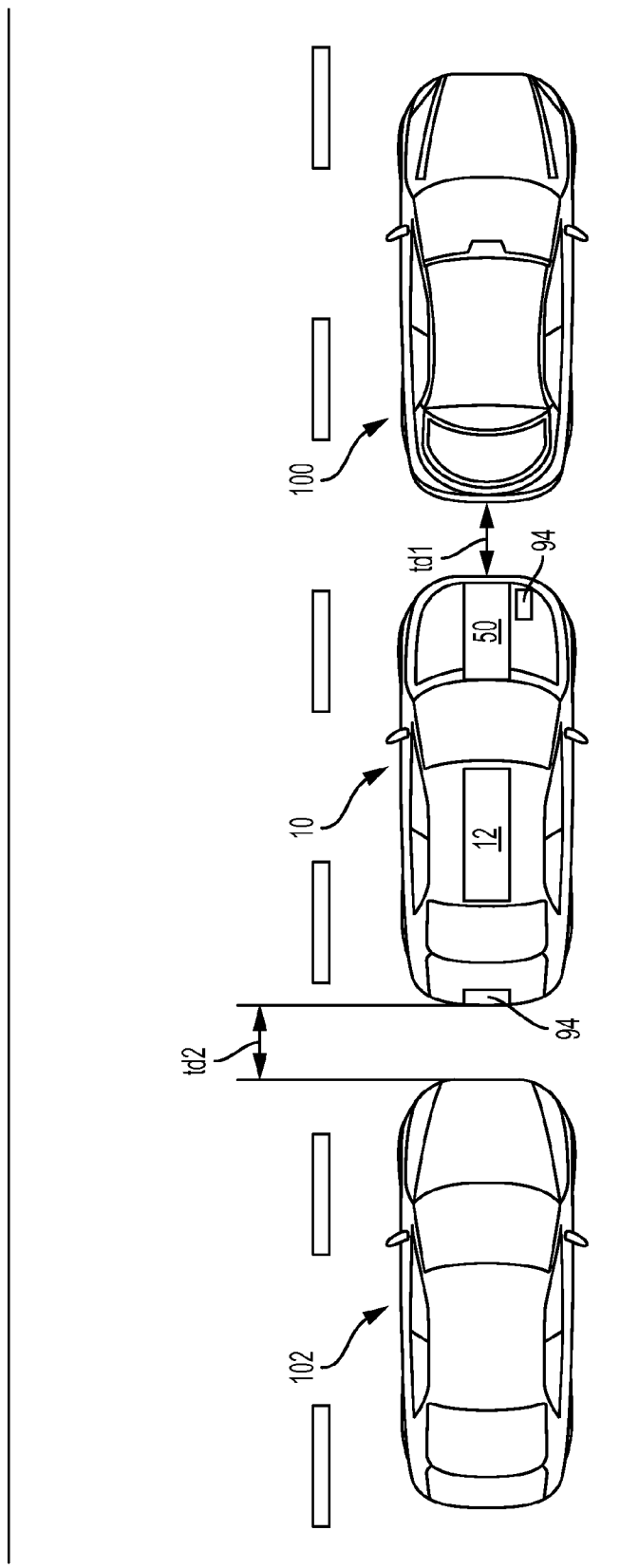
FIG. 2 is a top view of a vehicle in traffic jam conditions.

Referring to FIG. 2, a top view of the vehicle 10 in exemplary traffic jam conditions is shown. At least one proximity sensor 94 may be disposed within a front portion of the vehicle 10. The proximity sensor 94 may be configured to provide a signal indicative of the presence of at least one vehicle proximate the vehicle 10. The proximity sensor 94 may be a forward looking camera, a radar, an ultrasonic sensor, or the like configured to provide a signal indicative of a distance, $t_{d1}$, between the front portion of the vehicle 10 and a first vehicle 100. At least one proximity sensor 94 may be disposed within a rear portion of the vehicle 10. The proximity sensor 94 may be a rearward looking camera, a radar, an ultrasonic sensor, or the like configured to provide a signal indicative of a distance, $t_{d2}$, between the rear portion of the vehicle 10 and a second vehicle 102. The controller 50 may enable the interface 84 to receive a driver input, responsive to at least one of the first vehicle 100 within the distance, $t_{d1}$, and the second vehicle 102 within the distance, $t_{d2}$, while the vehicle speed is less than a threshold.

Figure 3:
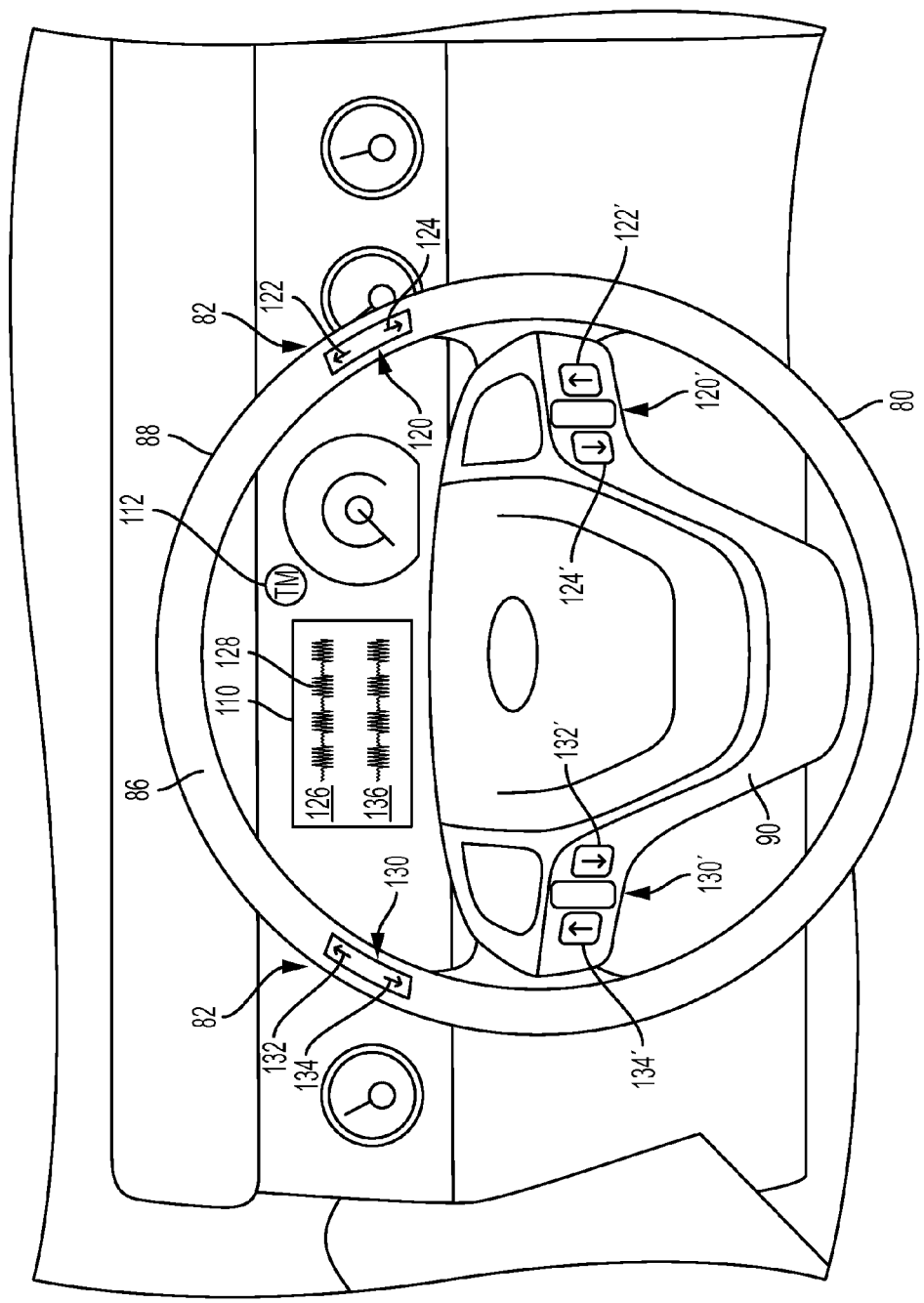
FIG. 3 is a partial view of the steering wheel assembly and a user interface.

Referring to FIG. 3, a partial view of the steering wheel assembly 16 and a user interface 110 is shown. An indicator 112 indicative of operation of the vehicle 10 in traffic mode may be output via the user interface 110 in response to the controller 50 detecting traffic jam conditions.

A first interface portion 120 of the interface 84 may be disposed proximate the first surface 86 of the steering wheel 80. In at least one embodiment, the first interface portion 120' may be disposed proximate the steering wheel hub 90. The first interface portion 120 or 120' may be located on the same side of the operator of the vehicle 10 as the accelerator pedal 60. The first interface portion 120 or 120' may be configured to receive a driver input that may enable the operator of the vehicle 10 to increase or decrease the vehicle speed a calibrated amount with respect to a creep vehicle speed. The creep vehicle speed may be a speed of the vehicle while the operator of the vehicle 10 has neither actuated the accelerator pedal 60 or the brake pedal 62 and the vehicle 10 is propelled by the idling torque of the engine 20 or power source.

The first interface portion 120 may be sized to receive a thumb of the operator of the vehicle 10. The first interface portion 120 may have a generally arcuate shape that may proximately match the curvature of the steering wheel 80. The first interface portion 120 may include a vehicle speed increment region 122 or 122' and a vehicle speed decrement region 124 or 124'. A driver input applied to the vehicle speed increment region 122 may provide a signal indicative of an adjusted accelerator pedal position to the controller 50 such that the powertrain 12 is operated to increase the vehicle speed a calibrated amount. The adjusted accelerator pedal position may indicate an increase in accelerator pedal position as compared to a previous accelerator pedal position. A driver input applied to the vehicle speed decrement region 124 may provide a signal indicative of an adjusted accelerator pedal position to the controller 50 such that the powertrain 12 is operated to decrease the vehicle speed a calibrated amount. The adjusted accelerator pedal position may indicate a decrease in accelerator pedal position as compared to a previous accelerator pedal position.

The vehicle speed increase or decrease that may occur responsive to actuation of the vehicle speed increment region 122 or the vehicle speed decrement region 124 may be calibrated based on the duration of the application of the driver input or the amount of pressure applied. For example, a short duration of the application to the vehicle speed increment region 122 may increase the vehicle speed a first calibrated amount above the creep vehicle speed. A longer duration of the application to the vehicle speed increment region 122 may increase the vehicle speed a second calibrated amount above the creep vehicle speed, where the second calibrated amount is greater than the first calibrated amount. A first input pressure applied to the vehicle speed increment region 122 may increase the vehicle speed a first calibrated amount above the creep vehicle speed. A second input pressure applied to the vehicle speed increment region 122 greater than the first input pressure or a threshold input pressure may increase the vehicle speed a second calibrated amount above the creep vehicle speed.

A short duration of the application to the vehicle speed decrement region 124 may decrease the vehicle speed a first calibrated amount. A longer duration of the application to the vehicle speed decrement region 124 may decrease the vehicle speed a second calibrated amount, where the second calibrated amount is greater than the first calibrated amount. A first input pressure applied to the vehicle speed decrement region 124 may decrease the vehicle speed a first calibrated amount. A second input pressure applied to the vehicle speed decrement region 124 greater than the first input pressure or a threshold input pressure may decrease the vehicle speed a second calibrated amount, wherein the second calibrated amount is greater than the first calibrated amount.

The increase or decrease of vehicle speed as a result of inputs received via the vehicle speed increment region 122 or the vehicle speed decrement region 124 of the first interface portion 120 may be subject to a first range of authority 126. The first range of authority 126 may be output for display via the user interface 110. The first range of authority 126 may provide discrete calibrated amounts that the vehicle speed may be increased relative to the creep vehicle speed. The first range of authority 126 may be based on the creep vehicle speed and a maximum vehicle speed above the creep vehicle speed. The controller 50 may be programmed to disable the interface 84 in response to a vehicle speed being greater than the maximum vehicle speed above the creep vehicle speed. The user interface 110 may provide a speed indicator 128 indicative of the vehicle speed relative to the first range of authority 126 of the first interface portion 120 of the interface 84.

A second interface portion 130 of the interface 84 may be disposed proximate the first surface 86 of the steering wheel 80. The second interface portion 130 may be radially spaced apart from the first interface portion 120. In at least one embodiment, the second interface portion 130' may be disposed proximate the steering wheel hub 90. The second interface portion 130 or 130' may be located on the same side of the operator of the vehicle 10 as the brake pedal 62. The second interface portion 130 or 130' may be configured to receive a driver input that may enable the operator of the vehicle 10 to decrease the vehicle speed a calibrated amount with respect to the creep vehicle speed.

The second interface portion 130 may be sized to receive a thumb of the operator of the vehicle 10. The second interface portion 130 may have a generally arcuate shape that may proximately match the curvature of the steering wheel 80. The second interface portion 130 may include a first brake application region 132 or 132' and a second brake application region 134 or 134'. A driver input applied to the first brake application region 132 may provide a signal indicative of an adjusted brake pedal position to the controller 50 such that the brake assembly 70 is operated to decrease the vehicle speed a first calibrated amount. The adjusted brake pedal position may indicate an increase in brake pedal position as compared to a previous brake pedal position or depression of the brake pedal 62. A driver input applied to the second brake application region 134 may provide a signal indicative of an adjusted brake pedal position to the controller 50 such that the brake assembly 70 is operated to decrease the vehicle speed a second calibrated amount. A brake application force associated with the second calibrated amount may be greater than a brake application force associated with the first calibrated amount. In at least one embodiment, a driver input applied to the first brake application region 132 may decrease the vehicle speed to approximate the creep vehicle speed. A driver input applied to the second brake application region 134 may decrease the vehicle speed below the creep vehicle speed or bring the vehicle 10 to a complete stop within a predetermined distance, $t_{d1}$, from the first vehicle 100.

The vehicle speed decrease that may occur responsive to actuation of the first brake application region 132 or the second brake application region 134 may be calibrated based on the duration of the application of the driver input or the amount of pressure applied. For example, a short duration of the application to the first brake application region 132 or the second brake application region 134 may decrease the vehicle speed a first calibrated amount. A longer duration of the application to the first brake application region 132 or the second brake application region 134 may decrease the vehicle speed a second calibrated amount, where the second calibrated amount is greater than the first calibrated amount. A first input pressure applied to the first brake application region 132 or the second brake application region 134 may decrease the vehicle speed a first calibrated amount. A second input pressure applied to first brake application region 132 or the second brake application region 134 greater than the first input pressure may decrease the vehicle speed a second calibrated amount, wherein the second calibrated amount is greater than the first calibrated amount.

The decrease of the vehicle speed as a result of inputs received via the first brake application region 132 or the second brake application region 134 of the second interface portion 130 may be subject to a second range of authority 136. The second range of authority 136 may be output for display via the user interface 110. The second range of authority 136 may provide discrete calibrated amounts that the vehicle speed may be decreased relative to the creep vehicle speed. The second range of authority 136 may correspond to or overlap with the first range of authority 126. The user interface 110 may provide a brake indicator 138 indicative of the vehicle speed relative to the first range of authority 136 of the second interface portion 130 of the interface 84.

The accelerator pedal 60 and the brake pedal 62 may override the interface 84 while the vehicle 10 is operating in traffic mode. The controller 50, while operating the vehicle 10 in traffic mode, may be programmed to disable the interface 84 in response to actuation of at least one of the accelerator pedal 60 and the brake pedal 62. In at least one embodiment, the controller 50 while operating the vehicle 10 in traffic mode may be programmed to disable the interface in response to a vehicle speed greater than a threshold. The vehicle speed greater than the threshold may be a vehicle speed greater than the first range of authority 126.

Figure 4:
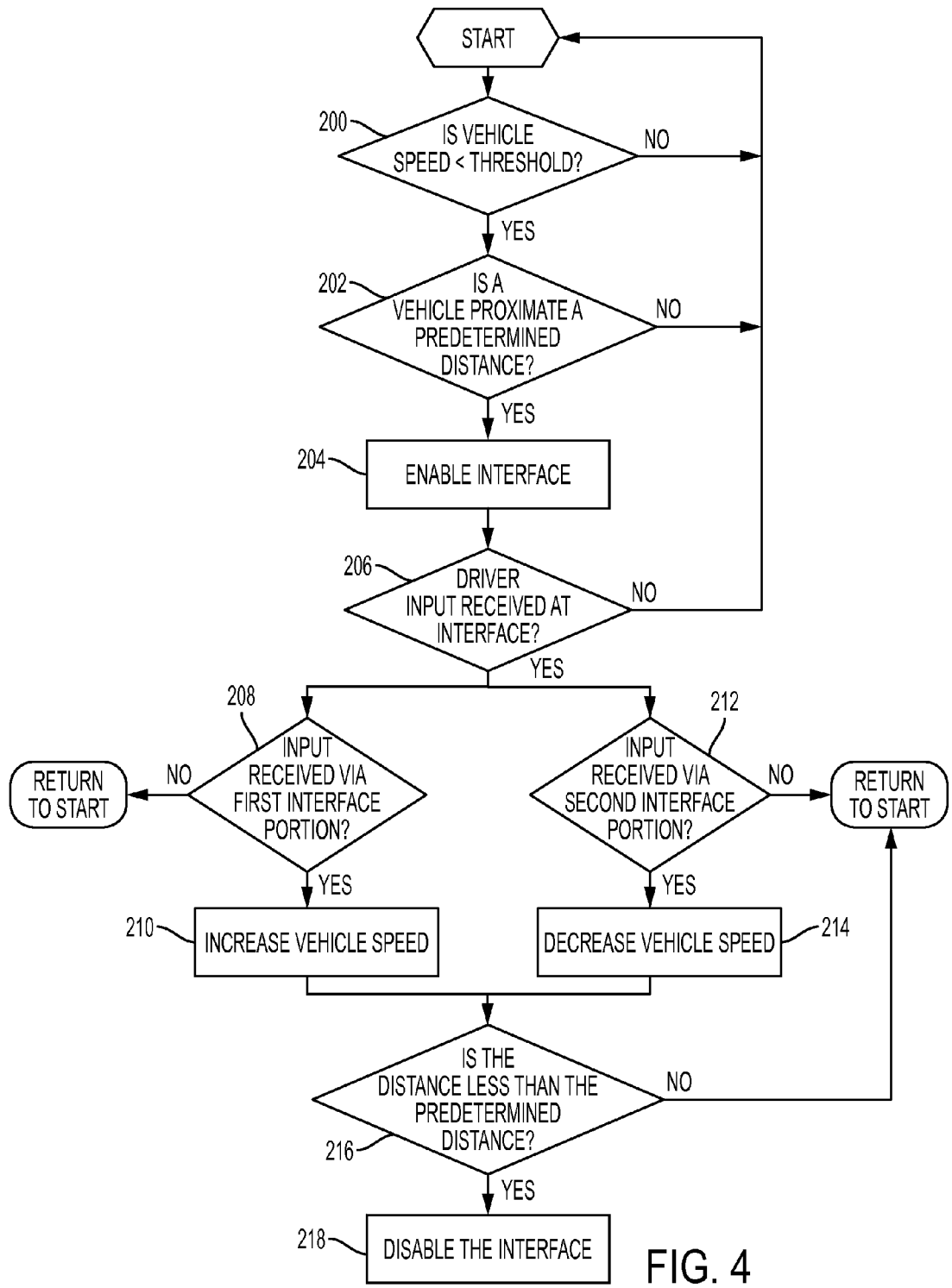
FIG. 4 is an exemplary method of controlling a vehicle.

Referring to FIG. 4, an exemplary method of controlling a vehicle is shown. The method may receive a vehicle speed, a signal indicative of a presence of a vehicle proximate the vehicle, and a signal indicative of a transmission state. At block 200, the method may compare the current vehicle speed to a threshold vehicle speed. Should the vehicle speed being greater than the threshold vehicle speed, the method may restart the execution cycle. If the vehicle speed is less than the threshold vehicle speed, the method may continue to block 202.

At block 202, the method may compare a measured distance between a vehicle proximate the vehicle 10 to a predetermined distance. Should the measured distance between a vehicle proximate the vehicle 10 be greater than the predetermined distance, the method may restart the execution cycle. If the measured distance between a vehicle proximate the vehicle 10 is within or proximate the predetermined distance, the method may enter a traffic mode. Upon entering the traffic mode, at block 204, the method may enable the interface 84 disposed on the steering wheel 80.

At block 206, the method may monitor to see if a driver input has been received at the interface 84. An operator of the vehicle 10 may be able to provide an input at a first interface portion 120 configured to perform the functions of the accelerator pedal 60. The operator of the vehicle 10 may also be able to provide an input at a second interface portion 130 configured to perform the functions of the brake pedal 62. Should the operator of the vehicle 10 not provide an input via the interface 84 the method may restart the execution cycle.

At block 206, if an operator of the vehicle 10 provides an input via the interface 84, the method may continue to blocks 208 or 212 depending on which interface portion received the input. At block 208, if an input is received via the first interface portion 120 the method may continue to block 210 where the powertrain 12 may be operated to increase the vehicle speed. The vehicle speed may be increased a predetermined amount, subject to a first range of authority 126. The vehicle speed may be increased by increasing a powertrain output torque.

At block 212, if an input is received via the second interface portion 130 the method may continue to block 214. At block 214, the vehicle speed may be decreased a predetermined amount, subject to a second range of authority 136. The vehicle speed may be decreased by activating the brake assembly 70 to apply a friction brake. The vehicle speed may also be decreased by reducing a powertrain output torque.

At block 216, the method, while operating the vehicle in traffic mode, may continue to assess if the enablement basics of: a vehicle speed less than a threshold vehicle speed and measured distance between a vehicle proximate the vehicle 10 be within or proximate the predetermined distance are still satisfied. If the vehicle speed is greater than the threshold vehicle speed or the measured distance between a vehicle proximate the vehicle 10 is less than the predetermined distance, the method may continue to block 218. At block 218 the method may exit traffic mode and disable the first interface portion 120 and the second interface portion 130 of the interface 84. In at least one embodiment, the method may output for display an indicator indicative of the disablement of the interface 84 and or the exiting from traffic mode.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
a steering wheel assembly including an interface; and
a controller programmed to
in response to a speed of the vehicle falling below a threshold, enable the interface and,
in response to a first driver input via the interface while enabled, apply a vehicle speed limit based on a first range of authority associated with the first driver input, and operate a powertrain to increase the speed.

2. The vehicle of claim 1 further comprising a brake assembly in communication with the controller, wherein the controller is further programmed to, in response to a second driver input via the interface while enabled, operate the brake assembly to decrease the speed subject to a second range of authority.

3. The vehicle of claim 2 wherein the controller is further programmed to, in response to the speed exceeding the threshold, disable the interface.

4. The vehicle of claim 2 wherein the controller is further programmed to output for display a first indicator indicative of the first range of authority and a second indicator indicative of the second range of authority.

5. The vehicle of claim 4 wherein the first range of authority is based on a creep vehicle speed and the vehicle speed limit.

6. The vehicle of claim 2 wherein the controller is further programmed to, in response to an actuation of at least one of an accelerator pedal and a brake pedal, disable the interface and remove the vehicle speed limit.

7. The vehicle of claim 2 wherein the interface includes a first interface portion disposed on a steering wheel radially spaced apart from a second interface portion disposed on the steering wheel.

8. The vehicle of claim 7 wherein the first interface portion is configured to receive the first driver input and the second interface portion is configured to receive the second driver input.

* * * * *